United States Patent
Feng et al.

(10) Patent No.: US 9,730,149 B2
(45) Date of Patent: Aug. 8, 2017

(54) DEVICE AND METHOD FOR MOBILE COMMUNICATION

(71) Applicant: MARVELL WORLD TRADE LTD, St. Michael (BB)

(72) Inventors: Haitao Feng, Shanghai (CN); Jing Ding, Shanghai (CN); Jianping Ma, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/645,964

(22) Filed: Mar. 12, 2015

(65) Prior Publication Data

US 2015/0264640 A1 Sep. 17, 2015

Related U.S. Application Data

(60) Provisional application No. 61/951,757, filed on Mar. 12, 2014.

(51) Int. Cl.
*H04Q 7/20* (2006.01)
*H04W 48/16* (2009.01)
*H04W 8/18* (2009.01)

(52) U.S. Cl.
CPC ........... *H04W 48/16* (2013.01); *H04W 8/183* (2013.01)

(58) Field of Classification Search
CPC .............................. H04W 48/00; H04W 48/18
See application file for complete search history.

(56) References Cited

U.S. PATENT DOCUMENTS

| | | | | |
|---|---|---|---|---|
| 2007/0042775 A1* | 2/2007 | Umatt | ................ | H04W 48/16 455/434 |
| 2009/0280802 A1* | 11/2009 | Chin | ................ | H04W 36/0088 455/426.1 |
| 2010/0255843 A1* | 10/2010 | Huang | .............. | H04W 52/0229 455/436 |
| 2012/0077494 A1* | 3/2012 | Kim | .................... | H04W 60/005 455/435.1 |
| 2012/0147850 A1* | 6/2012 | Zheng | ................... | H04W 48/16 370/331 |
| 2014/0141776 A1* | 5/2014 | Ko | ........................ | H04W 48/18 455/434 |
| 2014/0256316 A1* | 9/2014 | Lee | ....................... | H04W 48/16 455/434 |

\* cited by examiner

*Primary Examiner* — Nguyen Vo

(57) ABSTRACT

Aspects of the disclosure provide a method for use in a mobile communication device having at least a first communication system and a second communication system. The method includes conducting a network search with the first communication system to obtain network search information and providing the network search information to the second communication system in the mobile communication device to reduce a network search time of the second communication system.

14 Claims, 6 Drawing Sheets

DEVICE AND METHOD FOR MOBILE COMMUNICATION

INCORPORATION BY REFERENCE

This present disclosure claims the benefit of U.S. Provisional Application No. 61/951,757, "Equipment and Methods for Use in Dual-mode and Dual-card Mobile communication" filed on Mar. 12, 2014, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A mobile communication device can be configured to support multiple subscriber identity module (SIM) cards and operate on multiple mobile communication networks. A user of such a mobile communication device is able to choose from one of the communication networks to place a phone call. In addition, each SIM card can support multiple types of mobile communication networks that use different wireless access technologies, for example, a Global System for Mobile Communications (GSM) network, a Universal Mobile Telecommunications System (UMTS) network and a Long Term Evolution (LTE) network.

SUMMARY

Aspects of the disclosure provide a method for use in a mobile communication device having at least a first communication system and a second communication system. The method includes conducting a network search with the first communication system to obtain network search information and providing the network search information to the second communication system in the mobile communication device to reduce a network search time of the second communication system.

Embodiments of the method further include providing a first portion of the network search information to the second communication system to select a same cell as the first communication system, when a first subscriber identity module (SIM) card corresponding to the first communication system and a second SIM card corresponding to the second communication system belong to a same mobile network operator and have a same network mode configuration. In an embodiment, the first portion of the network search information is a carrier frequency of the same cell that is selected by the first communication system.

Additionally, embodiments of the method further include providing a second portion of the network search information to the second communication system to allow the second communication system to conduct a power scan on carrier frequencies that are not scanned by the first communication system. In an embodiment, the second portion of the network search information is carrier frequencies that are scanned by the first commination system.

The method further includes detecting that the second communication system is in a first network mode and receives a request of the network search in a second network mode that is different from the first network mode, and the first communication system is in the second network mode, and transferring the request to the first communication system to perform the network search in the second network mode. In an embodiment, the network search information is public land mobile network (PLMN) identity information of available networks that are found by the first communication system during the network search.

Embodiments of the method further include providing the network search information to the second communication system to reselect a cell that is reselected by the first communication system, when a first subscriber identity module (SIM) card corresponding to the first communication system and a second SIM card corresponding to the second system belong to a same mobile network operator and the first communication system and the second communication system are in a same network mode. In an embodiment, the network search information is a carrier frequency of the cell that is reselected by the first communication system.

In alternative embodiments, the first communication system and the second communication system are configured to operate in one of a Global System for Mobile Communications (GSM) network mode, a Universal Mobile Telecommunications System (UMTS) network mode and a Long Term Evolution (LTE) network mode.

Aspects of the disclosure provide a mobile communication device. The mobile communication device includes a first communication system having a first interface configured to access a first card identifying a first mobile network operator, a second communication system having a second interface configured to access a second card identifying a second mobile network operator, and a network search information sharing channel enabling information sharing between the first communication system and the second communication system. The network search information sharing channel is configured to provide network search information obtained during a network search conducted by the first communication system to the second communication system to reduce a network search time of the second communication system.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
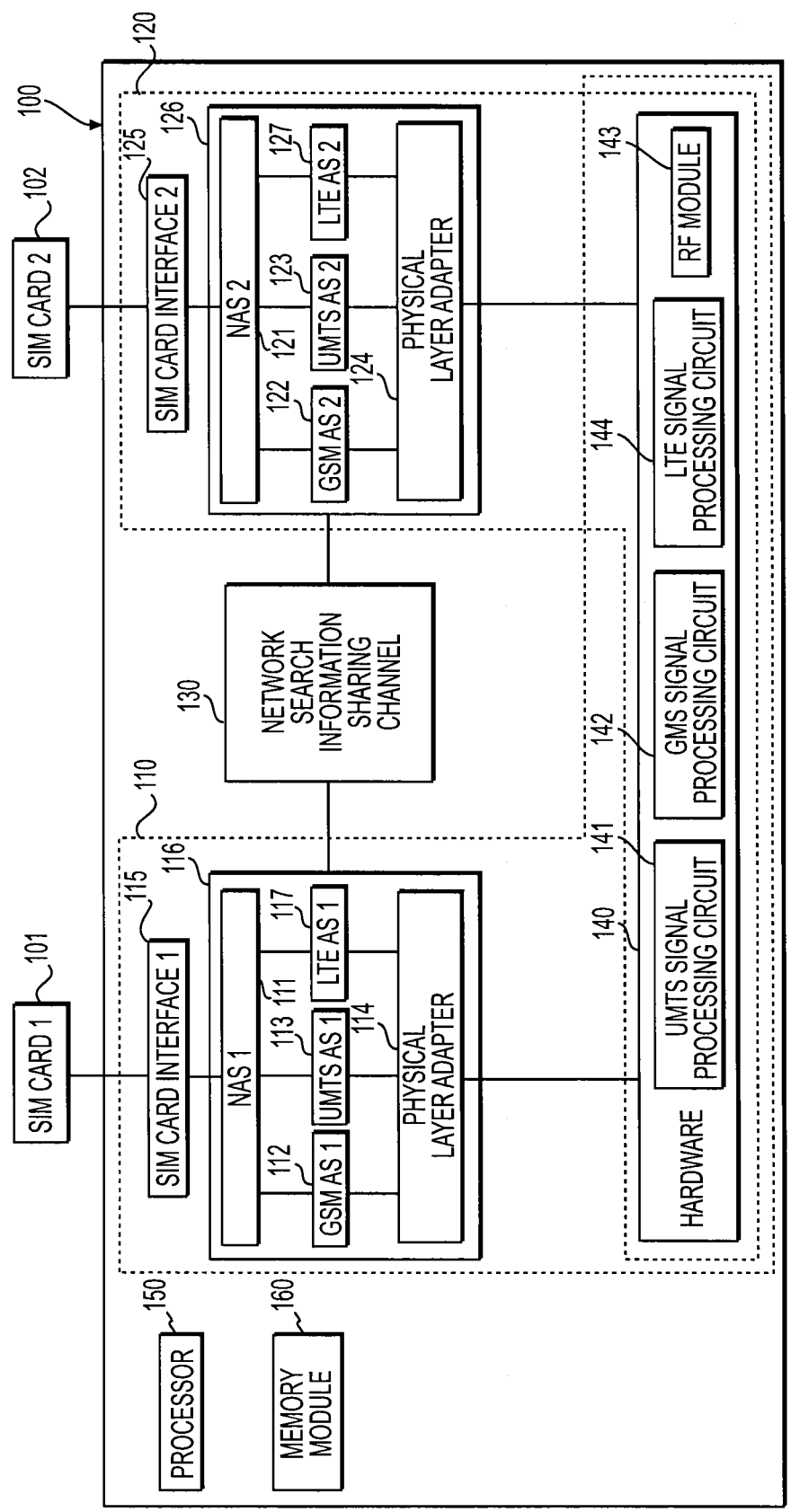
FIG. 1 shows a block diagram of a mobile communication device according to an embodiment of the disclosure.

FIG. 1 shows a block diagram of a mobile communication device 100 according to an embodiment of the disclosure.

The mobile communication device 100 includes a first communication system 110 coupled with a first subscriber identity module (SIM) card 101 via a first SIM card interface 115 and a second communication system 120 coupled with a second SIM card 102 via a second SIM card interface 125. As shown, the first communication system 110 and the second communication system 120 can be coupled together by a network search information sharing channel 130.

According to an aspect of the disclosure, the mobile communication device 100 utilizes the two communication systems 110 and 120 to realize dual-card communication functions. Specifically, the first communication system 110 manages communications between the mobile communication device 100 and a first mobile communication network based on configurations of the first SIM card 101, while the second communication system 120 manages communications between the mobile communication device 100 and a second mobile communication network based on configurations of the second SIM card 102. A user of the mobile communication device 100 can choose one of the two communication systems 110 and 120 to communicate, for example, by placing a phone call through, or receiving a phone call from either the first mobile communication network or the second mobile communication network.

According to an aspect of the disclosure, the network search information sharing channel 130 enables the first communication system 110 and the second communication system 120 to share network search information. In an embodiment, during a network search process, such as a power-on network search process, a background manual network search process, a cell reselection process and the like, the network search information sharing channel 130 provides network search information generated in one of the two communication systems 110 and 120 to the other one of the two communication systems 110 and 120 in order to reduce a search time of a network search in the other one of the two communication systems 110 and 120. In various embodiments, the network search information sharing channel 130 can be implemented with suitable software.

In the FIG. 1 example, the first communication system 110 and the second communication system 120 share a group of hardware 140. Accordingly, when one of the communication systems 110 and 120 is in a process of communicating with a mobile communication network, the other communication system is restricted. For example, when the first communication system 110 is processing a phone call, the second communication system 120 cannot receive or place a phone call. It is noted that, in another example, the first communication system 110 and the second communication system 120 have independent hardware.

In the FIG. 1 example, the first communication system 110 includes a protocol stack entity 116 and the hardware 140. Similarly, the second communication system 120 includes a protocol stack entity 126 and the hardware 140. The protocol stack entity 116 includes a non-access stratum (NAS) module 111, a Global System for Mobile Communications (GSM) access stratum (AS) module 112, a Universal Mobile Telecommunications System (UMTS) AS module 113, a Long Term Evolution (LTE) AS module 117, and a physical layer adapter 114. Similarly, the protocol stack entity 126 includes a NAS module 121, a GSM AS module 122, a UMTS AS module 123, a LTE AS module 127, and a physical layer adapter 124.

At the protocol stack entity 116, the NAS module 111 is coupled with the GSM AS module 112, the UMTS AS module 113 and the LTE AS module 117; the physical layer adapter 114 is coupled with the GSM AS module 112, the UMTS AS module 113, the LTE AS module 117, and a group of hardware 140. At the protocol stack entity 126, similarly, the NAS module 121 is coupled with the GSM AS module 122 and the UMTS AS module 123 and the LTE AS module 127; the physical layer adapter 124 is coupled with the GSM AS module 122, the UMTS AS module 123, the LTE AS module 127, and the hardware 140.

The hardware 140 includes a UMTS signal processing circuit 141, a GSM signal processing circuit 142, an LTE signal processing circuit 144 and a radio frequency (RF) module 143. Additionally, the mobile communication device 100 includes a processor 150 and a memory module 160. In an embodiment, the two protocol stack entities 116 and 126 are implemented using software that is stored in a non-volatile memory included in the memory module 160. When the mobile communication device 100 is powered on, the processor 150 executed the software and performs the functions of the two protocol stack entities 116 and 126.

According to an aspect of the disclosure, the mobile communication device 100 can operate in multiple network modes. A network mode refers to an operation state of a mobile communication device, such as the mobile communication device 100, or a communication system, such as the two communication systems 110 or 120, when the communication device or the communication system operates on a specific type of mobile communication network. For example, the first communication system 110 can operate on a GSM network, a UMTS network or an LTE network. When the first communication system 110 operates on a GSM network, the first communication system 110 is in GSM network mode; when the first communication system 110 operates on a UMTS network, the first communication system 110 is in UMTS network mode; when the first communication system 110 operates on an LTE network, the first communication system 110 is in LTE network mode. Similarly, the second communication system 120 can operate on a GSM network, a UMTS network or an LTE network. When the two communication systems 110 and 120 are in different network modes, for example, the first communication system 110 is in GSM mode and the second communication system 120 is in UMTS mode, the mobile communication device 100 is in GSM mode and UMTS mode at the same time. Accordingly, the mobile device 100 supports triple-mode communication.

GSM network is a mobile communication network based on GSM communication standard, UMTS network is a mobile communication network based on UMTS communication standard, and LTE network is a mobile communication network based on LTE communication standard. All the GSM, UMTS and LTE communication standards are developed by the 3rd Generation Partnership Project (3GPP) organization.

It should be understood that a communication system, such as the communication system 110 or 120, can operate in any number of different modes, and that any number of such communication systems can be included in the mobile communication device 100.

In an embodiment, each of the two communication systems 110 and 120 is configured to operate in one of the GSM mode, UMTS mode or LTE mode at a time. For example, when the first communication system 110 is in GSM mode, in the protocol stack entity 116, the GSM AS module 112 is active; however, the UMTS AS module 113 and the LTE AS module 117 are deactivated. While, for another example, when the first communication system 110 is in UMTS mode, the UMTS AS module 113 is active; however, the GSM AS module 112 and the LTE AS module 117 are deactivated. In addition, the two communication systems 110 and 120 can operate in a same mode or in different modes. For example, the two communication systems can be in GSM mode, UMTS mode or LTE mode at the same time. Or, in another example, the first communication system 110 is in GSM mode while the second system 120 is in UMTS mode.

During operation, the protocol stack entities 116 and 126 manage communications between the respective communication systems 110 and 120 and corresponding mobile communication networks. For example, in the protocol entity 116, the NAS module 111 establishes and maintains communication sessions between the NAS module 111 and network equipment inside of the mobile communication network on which the first communication system operates; while one of the AS modules 112, 113 or 117 establishes and maintains radio connections between the AS module and radio network equipment at edge of the mobile communication network. The radio connections are provided to the NAS module 111 by the AS module as channels used for the communication sessions between the NAS module 111 and the network equipment inside of the mobile communication network. In other words, signals from the NAS module 111 go through the radio connections and reach the network equipment inside of the mobile communication network.

The physical layer adapters 114 and 124 perform functions of hardware drivers and provide an interface for upper AS modules to transmit and receive signals through the hardware 140.

The hardware 140 is configured to support operations of the two communication systems 110 and 120 when the two communication systems are in same or different network modes. At the hardware 140, the signal processing circuits 141, 142 and 144 generally process traffic signals and control signals according to specific communication standards, for example, the GSM, UMTS or LTE communication standards. The traffic signals carrying voice or data information are generated from user applications (not shown in FIG. 1). The control signals are generated from the protocol stack entities 116 and 126. In operation, when the first communication system 110 and the second communication system 120 are in different network modes, the two protocol stack entities 116 and 126 can each control one of the three signal processing circuits 141, 142 and 144 to process the control signals. For example, when the first communication system 110 is in GSM mode and the second communication system 120 is in UMTS mode, the UMTS signal processing circuit 141 can be controlled by the protocol entity 126 to process control signals generated from the protocol entity 126, and the GSM signal processing circuit 142 can be controlled by the protocol entity 116 to process control signals generated from the protocol entity 116. However, when the two communication systems 110 and 120 are in the same mode, the two protocol stack entities 116 and 126 have to share a same signal processing circuit based on certain resource sharing mechanism. For example, when both the two communication systems 110 and 120 are in GSM mode, the two protocol stack entities can share the GSM signal processing circuit 142 in a time division manner.

The hardware 140 also includes a radio frequency (RF) module 143 for receiving and transmitting signals. To receive signals, the RF module 143 receives an RF signal from the air via an antenna (not shown) and down converts the RF signal to a baseband signal that is sent to one of the two signal processing circuits 141 and 142 for further processing. To transmit signals, the RF module up converts a baseband signal coming from the two processing circuits 141 and 142 to an RF signal and transmits it into the air.

The SIM cards 101 and 102 each contains an integrated circuit and one or more suitable applications, such as a SIM application or a universal subscriber identification module (USIM) application, that enable the SIM cards to support multiple-mode communication. In one embodiment, the SIM cards 101 and 102 each carries a USIM application that supports GSM, UMTS and LTE triple-mode communication.

In addition, each of the SIM cards 101 or 102 can store user application data, such as a phone book, and data related with mobile communication networks, such as international mobile subscriber identity (IMSI), temporary information related to the local network, multiple public land mobile network (PLMN) lists, wireless access technologies, carrier frequency information, and the like. A PLMN is a mobile communication network that is operated by a mobile network operator. A PLMN can use multiple wireless access technologies and include multiple types of mobile communication networks.

PLMN lists in a SIM card are configured by a mobile network operator or a user. The PLMN lists tell a mobile communication device in what order of PLMNs a network search process is conducted. In an embodiment, each entry of the PLMN lists includes the following information: PLMN identity information including a mobile country code (MCC) and a mobile network code (MNC), associated wireless access technologies, such as GSM wireless access technology, wideband code division multiple access (WCDMA) wireless access technology, LTE wireless access technology, carrier frequency information associated with each wireless access technology, and the like. PLMN identity information can be used to identify a specific PLMN. The carrier frequency information can include lists of carrier frequency bands assigned to a respective PLMN, or a list of carrier frequencies of a PLMN that the mobile communication device 100 last visited.

The processor 150 generally executes software, such as protocol stack entity software, user application software, and the like. The memory module 160 can include different types of devices such as random access memory (RAM), read only memory (ROM) and flash memory. In an embodiment, software code of the protocol entities 116 and 126 is stored in a non-volatile memory such as a flash memory or a ROM when a mobile communication device is powered off. The software code can be loaded into a RAM instantly when the mobile communication device is powered on.

The two SIM card interfaces 115 and 125 provide two slots holding the SIM cards 101 and 102, respectively.

In various network search processes, the network search information sharing channel 130 enables network search information to be shared between the two communication systems 110 and 120, and reduces network search time. The network search processes are now explained in detail with reference to FIGS. 2, 3 and 4.

Figure 2:
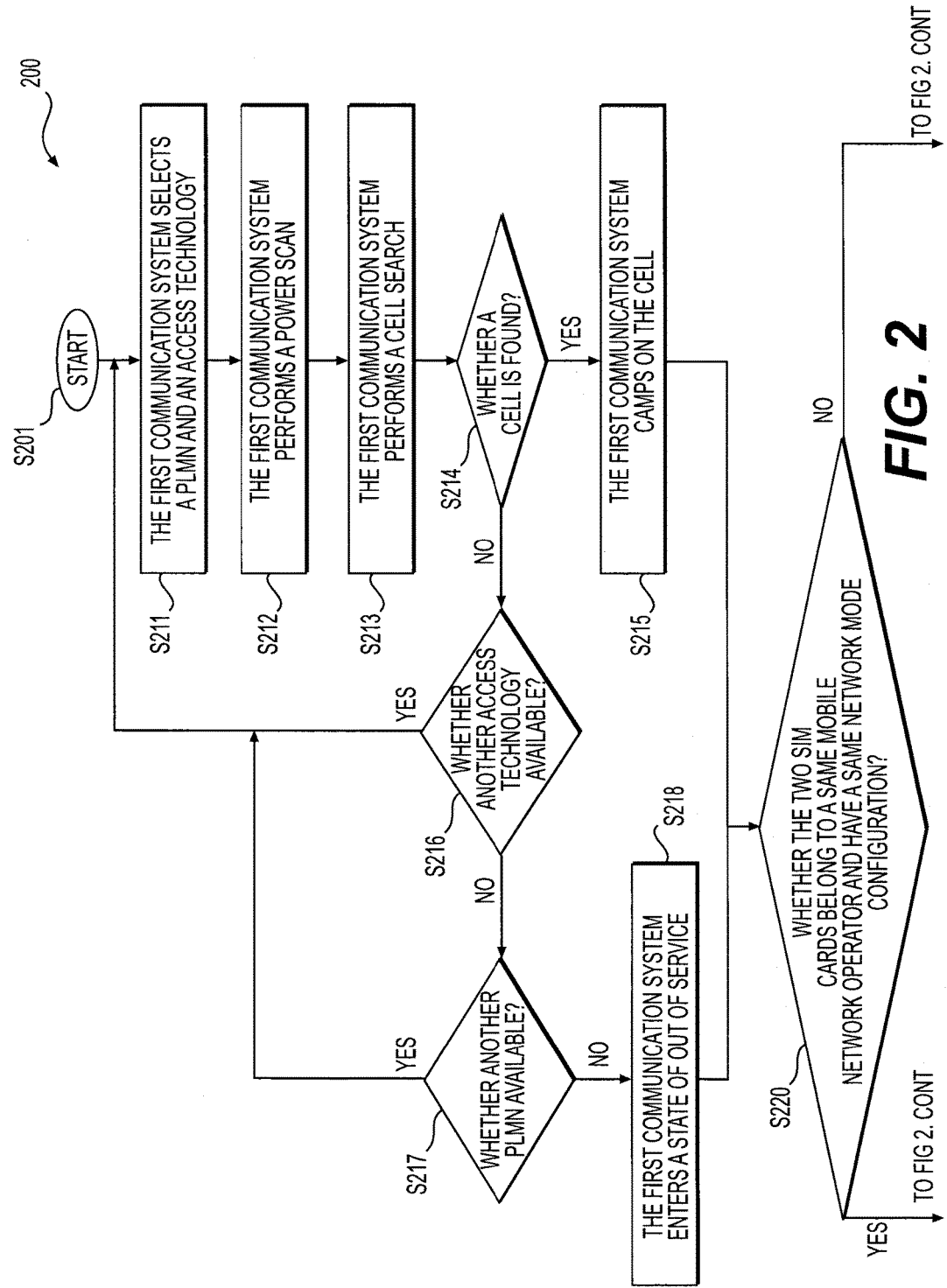
FIG. 2 shows a flow chart of a power-on network search process in a mobile communication device according to an embodiment of the disclosure.
Figure 2:
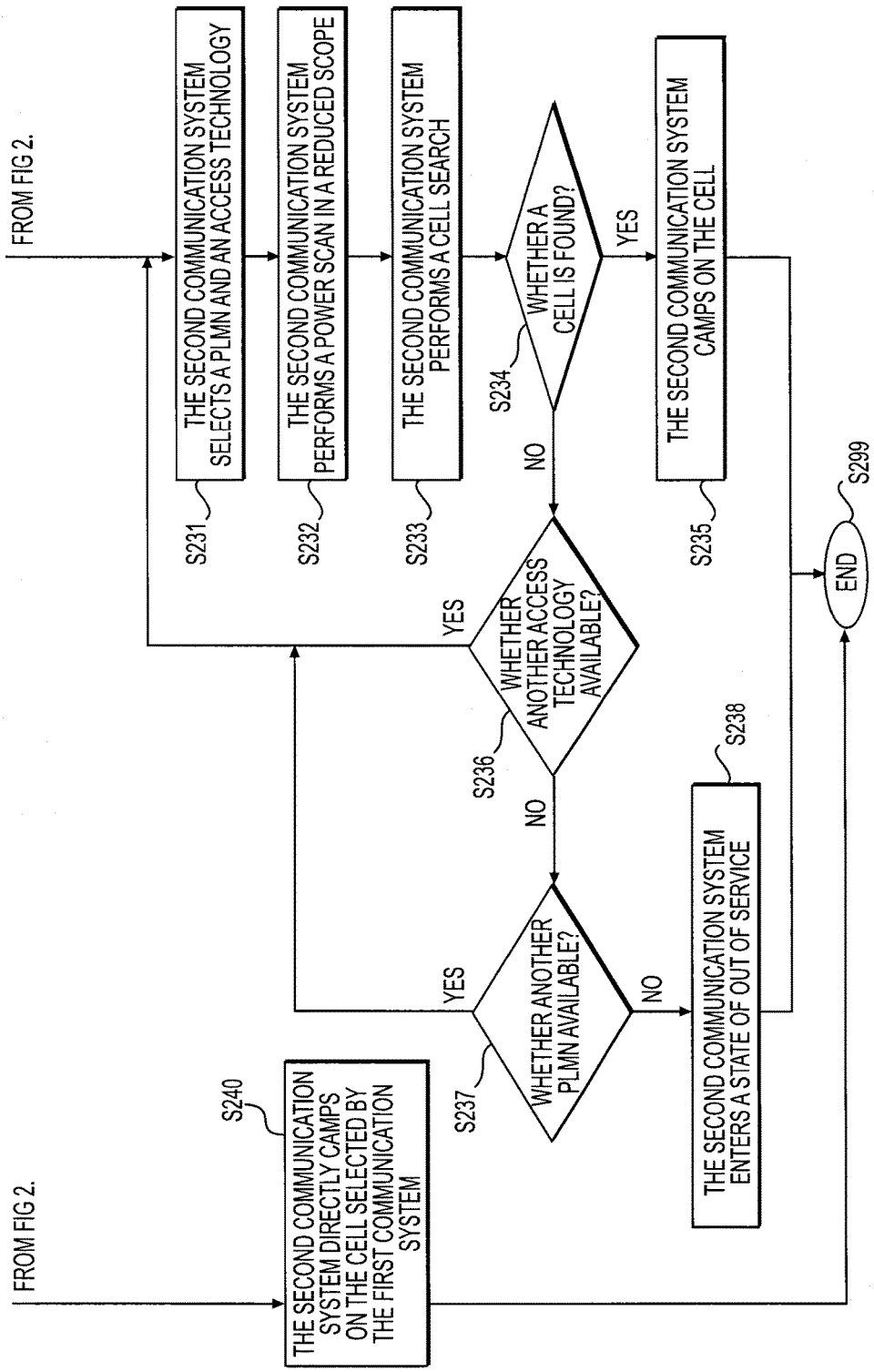

FIG. 2 shows a flow chart of a power-on network search process 200 in the mobile communication device 100 according to an embodiment of the disclosure.

In the embodiment, during the power-on network search process 200, the network search information sharing channel 130 provides network search information generated by one of the two communication systems 110 and 120 to the other one of the two communication systems 110 and 120 to reduce a network search time at the other one of the two communication systems 110 and 120. For example, after the mobile communication device 100 is powered on, the first communication system 110 performs a first part of the power-on network search process (steps from S211 to S215 and S218 in FIG. 2), and stores the related network search information including carrier frequencies the first communication system 110 has scanned and a carrier frequency of a cell the first communication system 110 has selected. Thereafter, based on PLMN information stored in the two SIM cards 101 and 102, the network search information sharing channel 130 determines whether the two SIM cards 101 and 102 belong to a same mobile network operator and have a same network mode configuration.

In an embodiment, the network search information sharing channel 130 compares the PLMN entries of the two SIM cards 101 and 102 to determine whether the two SIM cards 101 and 102 belong to a same mobile network operator. Specifically, each of the SIM cards 101 and 102 includes a Home-PLMN (HPLMN) entry in the PLMN lists, and the HPLMN entry includes PLMN identity information that indicates a mobile network operator from which a user of a SIM card subscribes services. By checking the PLMN identity information of the HPLMNs, the network search information sharing channel 130 can know the respective mobile network operators for the SIM cards 101 and 102.

In an embodiment, the network search information sharing channel 130 checks the wireless access technologies associated with the PLMN entries in the two SIM cards 101 and 102, respectively, to determine whether the two SIM cards 101 and 102 have the same network mode configuration. A network mode configuration refers to the order of the wireless access technologies associated with each PLMN entry in a SIM card. The network mode configuration can be configured by an operator or a user. Based on the network mode configuration, one of the communication systems 110 and 120, can choose a wireless access technology to start the network search process after the mobile communication device 100 is powered on and a PLMN is selected. For example, a HPLMN entry in the SIM card 101 has three associated wireless access technologies: the first one is GSM wireless access technology, the second one is WCDMA wireless access technology and the third one is LTE wireless access technology. Therefore, the HPLMN includes a GSM network corresponding to the GSM wireless access technology, a UMTS network corresponding to the WCDMA wireless access technology, and an LTE network corresponding to the LTE wireless access technology. When the mobile communication device 100 is powered on, the communication system 110 first select the HPLMN, then, based on the network mode configuration, chooses the GSM wireless access technology, to perform the power-on network search process searching for the GSM network of the HPLMN; if the GSM network is not found, the communication system 110, based on the network mode configuration, chooses the WCDMA wireless access technology, to continue the power-on network search process searching for the UMTS network of the HPLMN; if the UMTS network is not found, the communication system 110, based on the network mode configuration, chooses the LTE wireless access technology, to continue the power-on network search process searching for the LTE network of the HPLMN.

If the two SIM cards belong to a same mobile network operator and have a same network mode configuration, the network search information sharing channel 130 causes the second system to directly select the same cell selected by the first communication system 110 (step S240 in FIG. 2). Consequently, a second part of the power-on network search process 200 (steps from S231 to S235 and S238 in FIG. 2) can be skipped and the network search time is reduced.

Otherwise, the network search information sharing channel 130 causes the second communication system 120 to perform the second part of the power-on network search process 200 (steps from S231 to S235 and S238 in FIG. 2). However, a power scan process of the second part of the process 200 is only carried out on a reduced scope of carrier frequencies, such that the network search time of the second part of the process 200 is still reduced.

The detail of the power-on network search process 200 with support of the network search information sharing channel 130 is described below.

As shown in FIG. 2, the power-on network search process 200 starts at S201 and proceeds to S211. From S211 to S215 and S218, after the mobile communication device 100 is powered on, one of the two communication systems 110 or 120, for example, the first communication system 110 first conducts the first part of the network search process 200.

At S211, the NAS module 111 selects a PLMN with highest priority from PLMN lists and a wireless access technology associated with the selected PLMN. Specifically, the NAS module 111 first retrieves information, such as PLMN lists, wireless access technologies and carrier frequency bands, from the first SIM card 101. Next, the NAS module 111 selects the PLMN of highest priority from the PLMN lists. Thereafter, the NAS module 111 chooses a first one from a list of wireless access technologies associated with the selected PLMN, for example, GSM technology. Next, the NAS module 111 indicates the selected PLMN, associated wireless access technology chosen, and associated carrier frequency bands to an AS module that is activated. For example, if GSM wireless access technology is chosen, the GSM AS module 112 is activated, if WCDMA wireless access technology is chosen, the UMTS AS module 113 is activated, while if LTE wireless access technology is chosen, the LTE AS module 117 is activated.

At S212, the first communication system 110 performs a carrier frequency power scan process. In one embodiment, the active AS module, either 112, 113 or 117, instructs the hardware 140 to scan through all carrier frequencies included in the carrier frequency bands and measure power level of received signals corresponding to each carrier frequency. As a result, a list of carrier frequencies in a descending order of signal power level and having a signal strength above a specific threshold is obtained.

At the end of the power scan process, the NAS module 111 stores information of the carrier frequencies that have been scanned and the list of carrier frequencies having a signal strength above a specific threshold in a memory, such as the memory module 160, for possible use of the second communication system 120.

At S213, the first communication system 110 performs a cell search process based on the list of carrier frequencies having a signal strength above a specific threshold obtained at S212. In an example, the GSM AS module 112 is activated. Starting from the first frequency of the list of carrier frequencies having a signal strength above a specific threshold obtained at S212, the GSM AS module 112 decodes system information of cells corresponding to the carrier frequencies included in the list to obtain PLMN identity information of the cells. As described above, a cell's PLMN identity information includes the mobile country code (MCC) and the mobile network code (MNC). If a cell's PLMN has the same MCC and MNC as the PLMN selected at S211, this cell belongs to the PLMN selected at S211. The cell search process continues until a first cell belonging to the PLMN selected at S211 is found.

At S214, if a first such cell is found at S213, the process proceeds to S215. Otherwise, the process proceeds to S216.

At S215, the first communication system 110 selects the cell that is found at S213 and adjusts its own parameters according to parameters received from the cell, entering a state of camping on the cell. In the example raised at S213, the GSM AS module 112 informs the NAS module 111 and the NAS module 111 accordingly performs a registration process to register to the PLMN selected at S211. In addition, the NAS 111 stores carrier frequency of the selected cell, PLMN entity information of the PLMN selected at S211 and wireless access technology associated with the PLMN selected at S211, for example, in the memory module 160 for possible use by the second card communication system 120.

At S216, the NAS module 111 checks if there is another available wireless access technology associated with the PLMN selected at S211. If so, the process proceeds to S211 where the other wireless access technology with highest priority is selected, and the process repeats from S211 to S214. Otherwise, the process proceeds to S217.

At S217, the NAS module 111 checks if there is another available PLMN included in the PLMN lists retrieved from the SIM card 101. If so, the process proceeds to S211 where the other PLMN with the highest priority but having not been selected before is selected and the process repeats from S211 to S214. Otherwise, the process proceeds to S218.

At S218, the first communication system 110 enters a state of out of service (OSS). In an example, when in OSS state, the first communication system 110 selects and camps on a cell of a PLMN that is available in surrounding environment but is irrelevant with PLMNs included in the PLMN lists stored in the SIM card 101. In addition, the first card system 110 cannot use any service from the camped network except making an emergency call. In addition, the NAS 111 stores carrier frequency of the selected cell, PLMN entity information of selected PLMN and wireless access technology associated with the selected PLMN, for example, in the memory module 160 for possible use by the second communication system 120.

After the first communication system 110 completes the first part of the process 200, the process 200 proceeds to S220.

At S220, the network search information sharing channel 130 determines whether the second SIM card 102 and the first SIM card 101 belong to a same operator and have a same network mode configuration as described above. If the second SIM card 102 and the first SIM card 101 belong to the same operator and have the same network mode configuration, the process 200 proceeds to S240; otherwise, the process 200 proceeds to S231.

At S240, the network search information sharing channel 130 causes the second communication system 120 to select the cell that is selected by the first communication system 110. In an example, the network search information sharing channel 130 obtains carrier frequency of the selected cell, PLMN entity information of selected PLMN and wireless access technology associated with the selected PLMN, which are generated by the first communication system 110, from the memory module 160 and transmits it to the second communication system 120. Accordingly, an AS module in the second communication system 120 corresponding to the selected wireless access technology is activated. For example, when the GSM technology is finally selected by the first communication system 110 during the first part of the network search process, the GSM AS module 122 is activated. Based on the carrier frequency of the selected cell received from the network search information sharing channel 130, the GSM AS module 122 decodes system information of the selected cell. Accordingly, the second communication system 120 adjusts its own parameters according to parameters received from the cell and enters a state of camping on the cell. The process 200 proceeds to S299 and terminates at S299.

Start from S231, the network search information sharing channel 130 causes the second communication system 120 to perform the second part of the power-on network search process from S231 to S235 and S238. The second part of the process performed by the second communication system 120 is similar to the first part of the process performed by the first communication system 110, but based on information stored in the second SIM card 102. Operations in steps from S231 to S238 except S232 and S233 are similar to that in steps from S211 to S218 except S212 and S213, therefore description of these similar operations are omitted. However, operations at S232 and S233 are different from that at S212 and S213, and will be described below.

At S232, the power scan process of the network search process is only carried out in a reduced scope of carrier frequencies, such that network search time of the second part of the process is reduced. In an example, the network search information sharing channel 130 obtains information of the carrier frequencies that has been scanned from the memory module 160 (the information is stored in the memory module 160 at S212), and transmits information of the scanned carrier frequencies to the second communication system 120. Based on the information of the scanned carrier frequencies, the second communication system 120 performs the power scan process in a reduced scope. For example, at S231, a PLMN is selected and carrier frequency bands associated with this selected PLMN is obtained based on information stored in the second SIM card 102. When conducting the power scan process at S212, the second communication system 120 scans carrier frequencies included in the carrier frequency bands obtained from the second SIM card 102 but excludes the carrier frequencies already scanned by the first card communication system 110. As a result of the power scan process, a new list of carrier frequencies having a signal strength above a specific threshold is obtained.

At S233, in the example, the network search information sharing channel 130 obtains the stored list of carrier frequencies having a signal strength above a specific threshold from the memory module 160 (the information is stored in the memory module 160 at S212), and transmits the stored list to the second communication system 120. Accordingly, the second communication system 120 performs cell search process using a list including the following two groups of carrier frequencies: (1) the new list of carrier frequencies acquired at S232; and (2) carrier frequencies included in the stored list and, at the same time, included in the carrier frequency bands obtained from the second SIM card 102.

After operations at S235 and S238, the power-on network search process 200 proceeds to S299 and terminates at S299.

It is to be understood that applicability of power-on network search process 200 is not limited to scenarios when a mobile communication device is powered on. For example, when a mobile communication device, such as the mobile communication device 100, loses coverage of a mobile communication network, the power-on network search process 200 can be carried out by the mobile communication device 100 to search for a cell to be camped on.

Figure 3:
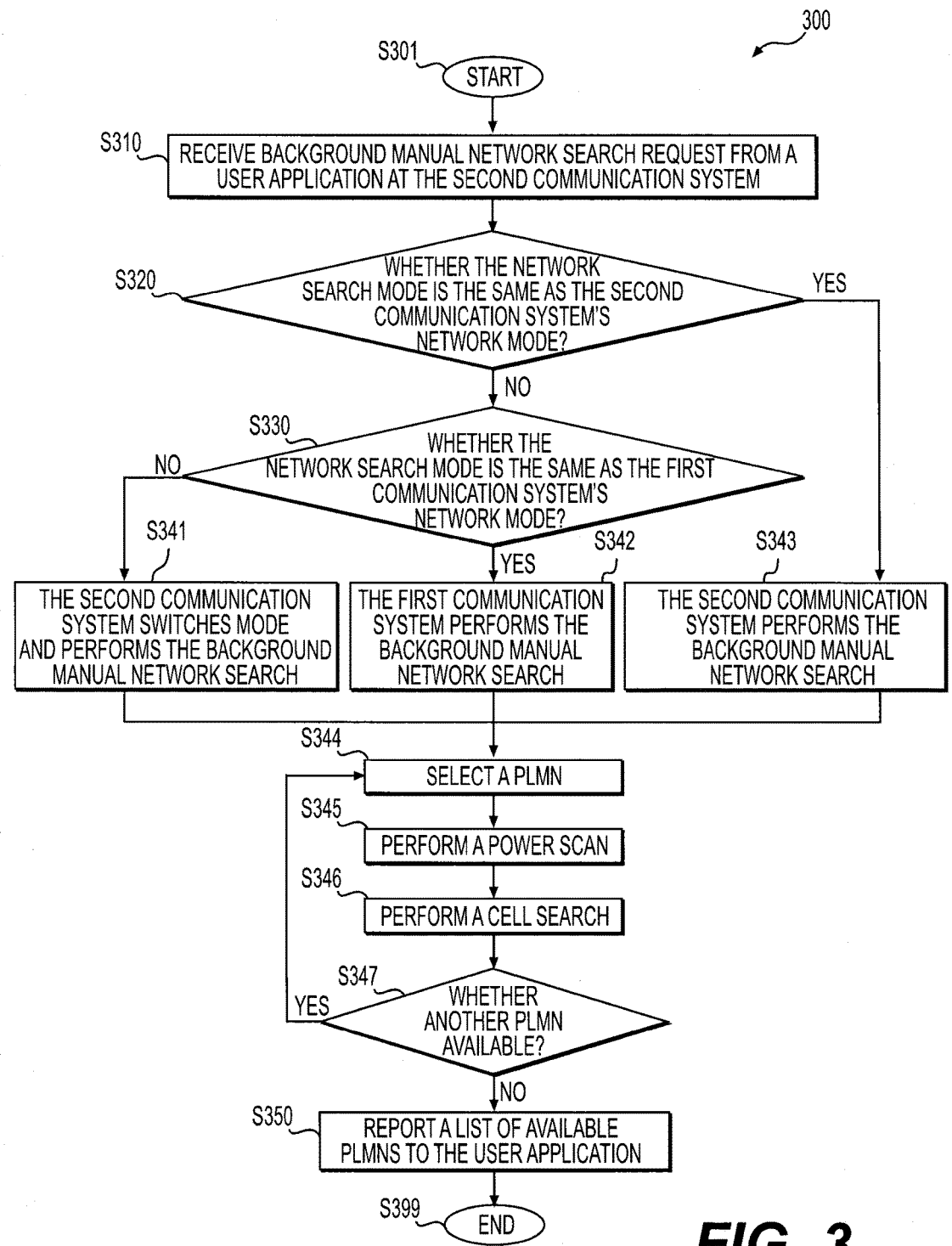
FIG. 3 shows a flow chart of a background manual network search process in a mobile communication device according to an embodiment of the disclosure.

FIG. 3 shows a flow chart of a background manual network search process 300 in the mobile communication device 100 according to an embodiment of the disclosure.

During the background manual network search process 300, a user of the mobile communication device 100 manually issues a command through a user application to request the mobile communication device 100 to search for all available mobile communication networks corresponding to a specific wireless access technology in surrounding environment of the mobile communication device 100. In an example, the user of the mobile communication device 100 requests the first communication system 110 of the mobile communication device 100 to perform a network search in GSM mode to search for all available GSM networks. To perform the network search in GSM mode, first, the NAS modules 111 and 121 can collect PLMN entries associated with GSM wireless access technology from, depending on user's command, one or two of the two SIM cards 101 and 102, and group these PLMNs into a to-be-found PLMN list. Next, based on this to-be-found list, the GMS AS module 112 of the first communication system can perform a network search in GSM mode to search for the PLMNs in the to-be-found list. Specifically, starting with the first PLMN in the to-be-found list, the GMS AS module 112 first requests the hardware 140 to perform the power scan process using information of carrier frequency bands associated with the first PLMN. Accordingly, a list of carrier frequencies having certain signal strength is obtained. Next, the GMS AS module 112 performs the cell search process. If a cell having a PLMN identity identical to the first PLMN is found, the first PLMN is found. In the similar way, the GMS AS module 112 continues the process until all PLMNs in the to-be-found list have been traversed. At the end, all PLMNs that have been found are reported to the user application.

In an embodiment, a user of the mobile communication device 100 requests the mobile communication device 100 to perform a "background" manual network search process. During the background manual network search process, network search operations do not affect the mobile communication device 100 receiving a paging message and are carried out within intervals between paging message monitoring actions. Specifically, in the mobile communication device 100, after a power-on network search process, each of the two communication systems 110 and 120, camps on a cell and enters a discontinuous reception (DRX) state. When in DRX state, there is no radio connection between the mobile communication device 100 and mobile communication networks. In addition, the hardware 140 periodically wakes up from a power down status to monitor the paging message broadcasted in the cells associated with the active AS modules. When a call is coming in, identity (ID) information of a SIM card, such as an international mobile subscriber identity (IMSI) number, is included in the paging message; the corresponding AS module sees this ID information and knows it is being called, and takes action to receive the call. During the intervals between the paging message monitoring actions, the manual network search operations are performed, thus paging message monitoring is not disturbed.

In an embodiment, the two communication systems 110 and 120 adopt a time division manner to share the hardware 140 to perform their respective paging message monitoring operation and network search operation. For example, the two communication systems 110 and 120 are in a same network mode, for example, GSM mode. During a first period, the first communication system 110 controls the GSM signal processing circuit 142 and the RF module 143 in the hardware 140. It performs paging message monitoring, and then performs network search operation. During a second period, the second communication system 120 controls the GSM signal processing circuit 142 and the RF module 143 in the hardware 140 to conduct its respective operations in a way similar to the first communication system 110. During a third period, the first communication system 110 controls the hardware 140 again. For another example, the two communication systems 110 and 120 are in different network modes, for example, the first communication system 110 is in GSM mode and the second communication system 120 is in UMTS mode. In this case, the first communication system 110 can use the GSM signal processing circuit 142 exclusively, while the second communication system 120 can use the UMTS signal processing circuit 141 exclusively. During different periods, the two communication systems only switch the control of the RF module 143, and no switch of signal processing circuit happens.

It is possible that a background manual network search process of each system may continue for multiple periods before its termination. It is also possible that, in other embodiments, during process described above, there can be only one system, either the first communication system 110 or the second communication system 120, that performs background network search operations.

According to an aspect of the disclosure, during a background manual network search process in the mobile communication device 100, the network search information sharing channel 130 detects that the second communication system 120 is in a first network mode and the first communication system 110 are in a second network mode, and the second communication system 120 requests a result of a background manual network search in a second network mode. Subsequently, the network search information sharing channel 130 causes the first communication system 110 to perform the background manual network search in the second network mode, and provide the result of the network search process to the second communication system 120. For example, in the mobile communication device 100, the second communication system 120 is in GSM mode and the first communication system 110 is in UMTS mode, and a user issues a command asking the second communication system 120 to perform a background manual network search for available UMTS networks for the second communication system 120. Accordingly, a background manual network search in UMTS mode needs to be performed. To do so, the network search information sharing channel 130 triggers the first communication system 110 to conduct a background manual network search process in UMTS mode and provide result of the search process to the second communication system 120.

In the above example, time of the network search process in UMTS mode is reduced. Specifically, in the above example, if the second communication system 120 in GSM mode performs the search in UMTS mode by itself, it needs to switch between GSM mode and UMTS mode to conduct GSM mode paging message monitoring and UMTS mode network search alternately; in addition, the second system needs to share the UMTS signal processing circuit 141 in the hardware 140 with the first communication system 110 which is in UMTS mode, thus additional switch of hardware resource control takes place. The switch operations consume additional time. Therefore, the background manual network search process described above is preferred.

The background manual network process 300 will now be described in more detail. As shown, the process 300 starts at 5301 and proceeds to S310.

At S310, a user of the mobile communication device 100 issues a command to the second communication system 120 requesting a background manual network search for, for example, available GSM networks corresponding to the second SIM card 102. Therefore, the network search mode for the search is GSM mode. The NAS module 121 transmits this request to the network search information sharing channel 130.

At S320, the network search information sharing channel 130 determines whether the network search mode is the same as the second communication system 120's network mode. If the second communication system 120 is in GSM mode, the process 300 proceeds to S343. Otherwise, if the second communication system 120 is in UMTS mode, the process 300 proceeds to S330.

At S343, the network search information sharing channel 130 requests the second communication system 120 to do the network search. The second system is in GSM mode and performs the search in GSM mode. The process 300 proceeds to S344.

At S330, the network search information sharing channel 130 determines whether the network search mode is the same as the first communication system 110's network mode. If it is not, for example, the first communication system 110 is in a UMTS mode the same as the second system, the process 300 proceeds to S341. Otherwise, if the network search mode is the same as the first communication system 110's network mode (GSM mode), the process 300 proceeds to S342.

At S341, the network search information sharing channel 130 requests the second communication system 120 to do the network search in GSM mode although the second system 130 is in UMTS mode. The second communication system 120 switches between UMTS mode and GSM mode to monitor paging message from a UMTS network and to perform the network search in GSM mode, alternately. The switch may take place for multiple rounds until the background search is completed. The process 300 proceeds to S344.

At 342, the network search information sharing channel 130 requests the first communication system 110 to do the network search in GSM mode. As discussed above, the first communication system 110, currently in GSM mode, performing the network search in GSM mode reduces the time of background manual network search compared with the second system, currently in UMTS mode, performing the network search in GSM mode. The process 300 proceeds to S344.

From S344 to S347, a system, either the first or the second communication system, performs a background network search for all available GSM networks.

At S344, a system, for example, the first communication system 110, starts the background network search. The NAS module 111 selects a PLMN from a to-be-found PLMN list. The to-be-found PLMN list is generated at the NAS module 121 in the second system 120, and the NAS module 111 receives the to-be-found PLMN list via the network search information sharing channel 130 from the NAS module 121. The to-be-found PLMN list includes all PLMNs associated with GSM wireless access technology in the second SIM cards. In case the second communication system 120 starts the background search at S344, the NAS module 121 selects a PLMN from the to-be-found PLMN list.

At S345, the GSM AS module 112 supported by the hardware 140 performs a power scan process using carrier frequency band information associated with the PLMN selected at S344. A list of carrier frequencies having a signal strength above a threshold is obtained.

At S346, the GMS AS module 112 supported by the hardware 140 performs a cell search process. Starting from a first carrier frequency until the last carrier frequency in the list of carrier frequencies having a signal strength above a threshold obtained at S345, the GMS AS module decodes system information of each cell of respective carrier frequency to look for PLMN identity information that is identical to that of the PLMN selected at S344. If such a cell is found, the PLMN selected at S344 is available. Otherwise, the PLMN selected at S344 is not available.

At S347, the NAS module 111 determines whether another PLMN in the PLMN list received at S354 is available. If there is another one available, the first communication system 110 repeats the steps from S344 to S347 to search for another possible available PLMN. If all PLMNs included in the to-be-found PLMN list received at S344 have been searched for, the process 300 proceeds to S350.

At S350, a list of PLMN identity information of available PLMNs found at S346 is reported to the user application. In the case that the first system 110 performs the network search, the list of available PLMNs is provided to the second system 120 by the information sharing channel, and the NAS module 121 reports the list to the user application. In the case that the second system 120 performs the network search, the NAS module 121 directly reports the list to the user application. Thereafter, the process 300 proceeds to S399 and terminates at S399.

Figure 4:
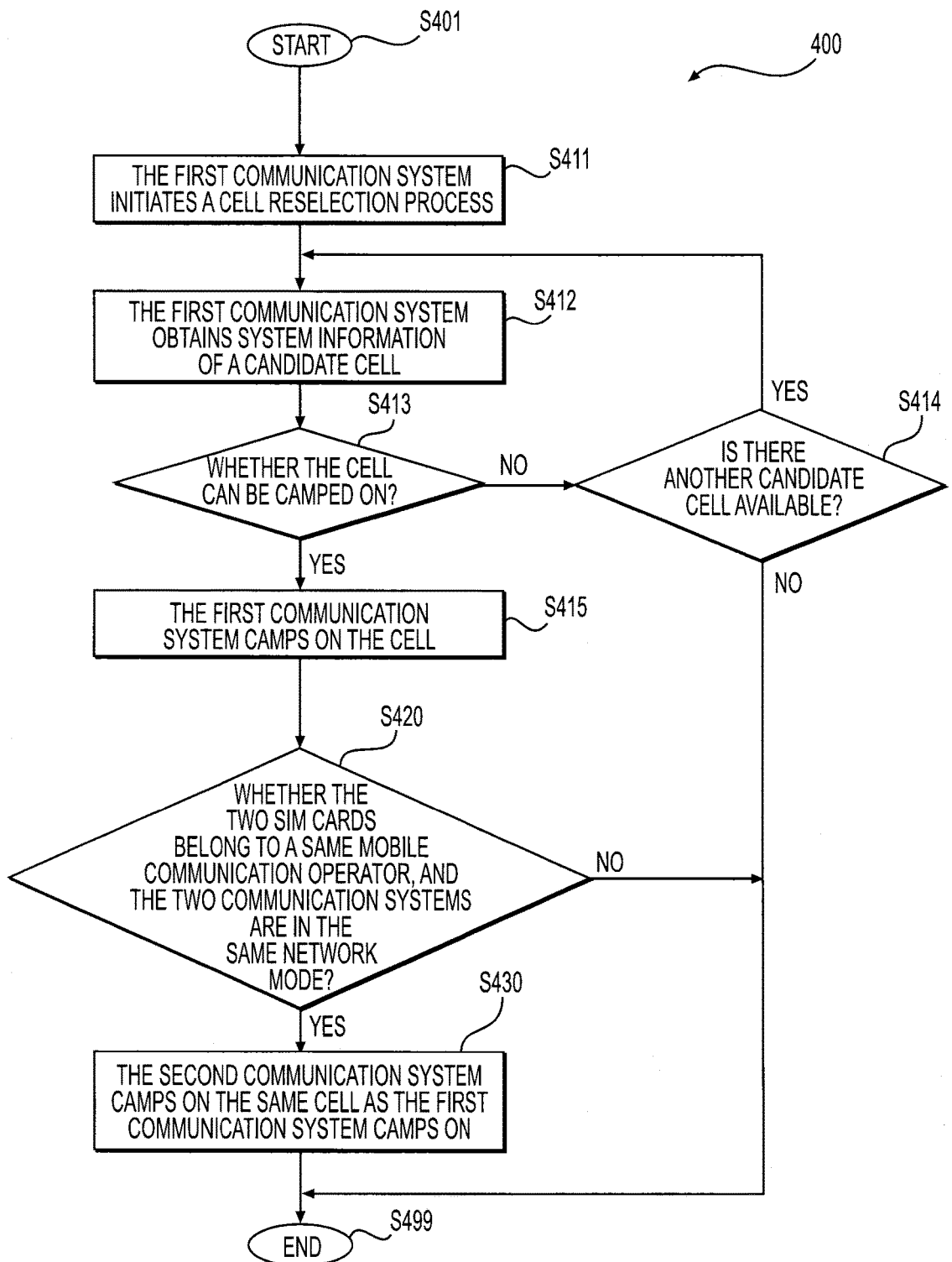
FIG. 4 shows a flow chart of a cell reselection process in a mobile communication device according to an embodiment of the disclosure.

FIG. 4 shows a flow chart of a cell reselection process 400 in the mobile communication device 100 according to an embodiment of the disclosure.

In an embodiment, after a power-on network search process as described above, the mobile communication device 100 enters a discontinuous reception (DRX) state. When in DRX state, in addition to monitoring paging messages, an active AS module in each communication system 110 and 120 in the mobile communication device 100 continuously inspects signal strength measurement reports of neighboring cells provided by the hardware 140. When a cell reselection criterion is satisfied for one communication system 110 or 120, the corresponding active AS module starts a cell resection process (from S411 to S415 in FIG. 4) that is part of the cell reselection process 400.

According to an aspect of the disclosure, in the cell reselection process 400, when, for example, the first communication system 110 initiates and completes the cell reselection process, the network search information sharing channel 130 instructs the second communication system 120 to reselect the same cell as the first communication system 110 has selected when certain conditions are satisfied. Accordingly, the second communication system 120 needs not to perform a cell search process in its cell reselection process, thus a search time of the second communication system 120's cell reselection process is avoided. Specifically, the network search information sharing channel 130 determines whether the SIM cards 101 and 102 belong to a same mobile network operator and the two communication systems 110 and 120 are in the same network mode. If the determination is positive, the second communication system 120 reselects the same cell as the first communication system 110 has selected. In an embodiment, to determine whether the SIM cards 101 and 102 belong to the same mobile network operator, the network search information sharing channel 130 checks PLMN identity information of each HPLMN in each SIM card 101 or 102. If the PLMN identity information of the two HLPMNs is the same, the SIM cards 101 and 102 belong to the same mobile network operator.

The cell reselection process 400 in the mobile communication device 100 will now be described in more detail. As shown, the process 400 starts at S401 and proceeds to S411. From S411 to S415, the first communication system 110 performs a cell reselection process.

At S411, the hardware 140 continuously performs signal strength measurements on the mobile communication device 100's neighboring cells for the two communication systems 110 and 120. An active AS module in each of the two communication systems 110 and 120 monitors measurement reports provided by the hardware 140. When, for example, the AS module 112 in the first communication system 110 detects that cell reselection criteria are satisfied, for example, the received signal strength of current cell is below a threshold, the GSM AS module 112 initiates the cell reselection process.

At S412, the GSM AS module 112 chooses a candidate cell from the neighboring cells being monitored, and obtains system information from the candidate cell.

At S413, the GSM AS module 112 determines whether the candidate cell can be camped on based on the obtained system information. If the determination is positive, the process 400 proceeds to S415. Otherwise, if the candidate cell cannot be camped on, for example, there is no enough capacity to accept a new mobile communication device to the cell, the process 400 proceeds to S414.

At S414, the GSM module 112 determines whether there is another candidate cell available among the neighboring cells. If the other candidate cell is available, the cell reselection process proceeds to S412. Otherwise, the process 400 proceeds to S499 and terminates at S499.

At S415, the first communication system 110 reselects the candidate cell and adjusts its parameters according to the obtained system information and camps on the candidate cell. If a location area information in the obtained system information is not the same as stored information in the communication system 110, the NAS module 111 can perform a location registration process. Thereafter, the communication system 110 enters a discontinuous reception (DRX) state. In addition, a carrier frequency of the candidate cell is stored in the memory module 160 for possible use of the second communication system 120.

At S420, the network search information sharing channel 130 detects that the first communication system 110 completes the cell reselection process and determines whether the two SIM cards 101 and 102 belong to a same mobile network operator and the two communication systems 110 and 120 are in the same network mode. As described above, the network search information sharing channel 130 can check HPLMN entity information in each SIM card 101 or 102. If the HPLMN entity information is the same, the two SIM cards 101 and 102 can be determined to belong to the same mobile network operator. When the determination is negative, the process proceeds to S499 and terminates at S499. Otherwise, the process 400 proceeds to S430.

At S430, the network search information sharing channel 130 provides the carrier frequency of the candidate cell the first system has reselected to the second communication system 120 and instructs the second communication system 120 to camp on the cell reselected by the first communication system 110. Thereafter, the process 400 proceeds to S499 and terminates at S499.

Figure 5:
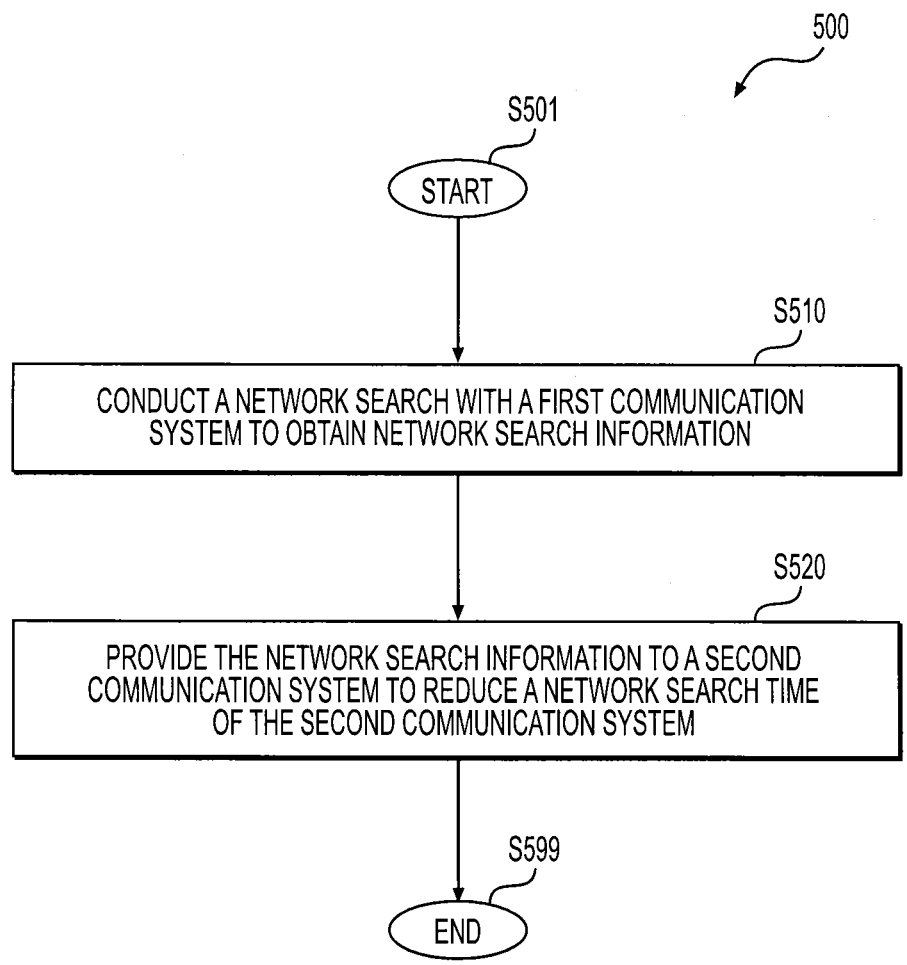
FIG. 5 shows a flow chart of a process for sharing network search information between two communication systems in a mobile communication device according to an embodiment of the disclosure.

FIG. 5 shows a flowchart of a process 500 for sharing network search information between two communication systems in a mobile communication device according to an embodiment of the disclosure. The process 500 is used in the processes 200, 300, and 400 in the mobile communication device 100.

As shown, the process 500 starts at S501 and proceeds to S510. At S510, a first communication system in the mobile communication device 100 conducts a network search to obtain network search information.

In the example of the process 200, the communication system 110 first performs a cell search process. During the cell search process, network search information, such as a carrier frequency of a cell selected by the first communication system 110 and a list of carrier frequencies scanned by the first communication system 110, is obtained. In the example of the process 300, the communication system 110 first performs a background manual network search for certain type of available networks when the network search information sharing channel 130 detects that the communication systems 110 and 120 are in different mode and the communication system 120 requests a background network search in a mode the same as the mode of the communication system 110. At the end of the background manual network search, network search information, such as a list of PLMN identity information of available networks, is obtained. In the example of the process 400, the communication system 110 first performs a cell reselection process, and network search information, such as a carrier frequency of a cell reselected by the communication system 110, is obtained.

At S520, the network search information sharing channel 130 provides the network search information to a second communication system in the mobile communication device to reduce a network search time of the second communication system.

In the example of the process 200, the cell search time of the second communication system 120 is reduced. In the example of the process 300, the search time of the background manual network search requested by the second communication system 120 is reduced. In the example of the process 400, the cell reselection time of the second communication system 120 is reduced. Thereafter, the process 500 proceeds to S599 and terminates at S599.

It is noted that although aspects of the present disclosure are described using embodiments based on GSM, UMTS and LTE mobile communication networks and related wireless access technologies, embodiments employing any other types of mobile communication networks and technologies can be made without departing from the spirit and scope of the invention.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:
1. A method, comprising:
performing a first power scan process on a first list of carrier frequencies by a first communication system in a mobile communication device to obtain a second list of carrier frequencies each having a signal strength above a threshold, the first communication system having a first interface configured to access a first card identifying a first mobile network operator;
performing a first cell search process by the first communication system to search for a first cell of a wireless network to camp on from cells having a carrier frequency included in the second list of carrier frequencies;
storing the first list of carrier frequencies that has been scanned by the first communication system during the first power scan process in a memory;
storing the obtained second list of carrier frequencies each having a signal strength above a threshold in the memory;
storing a carrier frequency of the first cell which the first communication system camps on in the memory; and
providing one of the first list of carrier frequencies, the second list of carrier frequencies, and the carrier frequency of the first cell to a second communication system in the mobile communication device to reduce network search time of the second communication system, wherein the second communication system has a second interface configured to access a second card identifying a second mobile network operator.

2. The method of claim 1, wherein providing one of the first list of carrier frequencies, the second list of carrier frequencies, and the carrier frequency of the first cell to a second communication system includes:
determining whether the first card and the second card belong to a same mobile network operator and have a same network mode configuration; and
when the first card and the second card belong to a same mobile network operator and have a same network mode configuration,
providing the carrier frequency of the first cell which the first communication system camps on to the second communication system, and
selecting, by the second communication system, the first cell to camp on based on the provided carrier frequency of the first cell without performing a power scan process or a cell selection process.

3. The method of claim 2, wherein providing one of the first list of carrier frequencies, the second list of carrier frequencies, and the carrier frequency of the first cell to a second communication system further includes:
when the first card and the second card do not belong to a same mobile network operator,
providing the first list of carrier frequencies that has been scanned by the first communication system during the first power scan process to the second communication system, and
performing a second power scan process by the second communication system on carrier frequencies on a third list of carrier frequencies but not included in the first list of carrier frequencies to obtain a fourth list of carrier frequencies having a signal strength above the threshold.

4. The method of claim 3, wherein providing one of the first list of carrier frequencies, the second list of carrier frequencies, and the carrier frequency of the first cell to a second communication system further includes:
when the first card and the second card do not belong to a same mobile network operator,
providing the obtained second list of carrier frequencies each having a signal strength above a threshold to the second communication system, and
performing a second cell search process by the second communication system to search for a second cell of a wireless network to camp on from cells having a carrier frequency on the obtained fourth list or cells having a carrier frequency on both the obtained second list of carrier frequencies each having a signal strength above a threshold and the third list of carrier frequencies.

5. The method of claim 1, further comprising:
as a response to a user request, performing, by the first communication system, the background network search for a wireless network corresponding to the second wireless access technology that is available for the second communication system, when the second communication system is in a first network mode corresponding to a first wireless access technology, and the first communication system is in a second network mode corresponding to a second wireless access technology.

6. The method of claim 5, wherein the network search information is public land mobile network (PLMN) identity information of available networks that are found by the first communication system during the background network search.

7. The method of claim 1, wherein the first communication system and the second communication system are each configured to operate in one of a Global System for Mobile Communications (GSM) network mode, a Universal Mobile Telecommunications System (UMTS) network mode and a Long Term Evolution (LTE) network mode.

8. A mobile communication device, comprising:
a first communication system having a first interface configured to access a first card identifying a first mobile network operator, the first communication system being configured to,
perform a first power scan process on a first list of carrier frequencies to obtain a second list of carrier frequencies each having a signal strength above a threshold,
perform a first cell search process to search for a first cell of a wireless network to camp on from cells having a carrier frequency included in the second list of carrier frequencies,
store the first list of carrier frequencies that has been scanned by the first communication system during the first power scan process in a memory,
store the obtained second list of carrier frequencies each having a signal strength above a threshold in the memory; and
store a carrier frequency of the first cell which the first communication system camps on in the memory;
a second communication system having a second interface configured to access a second card identifying a second mobile network operator; and
a network search information sharing channel enabling information sharing between the first communication system and the second communication system, the network search information sharing channel configured to,
provide one of the first list of carrier frequencies, the second list of carrier frequencies, and the carrier frequency of the first cell to the second communication system in the mobile communication device to reduce network search time of the second communication system.

9. The mobile communication device of claim 8, wherein, the network search information sharing channel is configured to, determine whether the first card and the second card belong to a same mobile network operator and have a same network mode configuration, and when the first card and the second card belong to a same mobile network operator and have a same network mode configuration, provide the carrier frequency of the first cell which the first communication system camps on to the second communication system, and the second communication system is configured to, select the first cell to camp on based on the provided carrier frequency of the first cell without performing a power scan process or a cell selection process.

10. The mobile communication device of claim 9, wherein, the network search information sharing channel is configured to, when the first card and the second card do not belong to a same mobile network operator, provide the first list of carrier frequencies that has been scanned by the first communication system during the first power scan process to the second communication system, and the second communication system is configured to, perform a second power scan process on carrier frequencies on a third list of carrier frequencies but not included in the first list of carrier frequencies to obtain a fourth list of carrier frequencies having a signal strength above the threshold.

11. The mobile communication device of claim 10, wherein the network search information sharing channel is configured to, when the first card and the second card do not belong to a same mobile network operator, provide the obtained second list of carrier frequencies each having a signal strength above a threshold to the second communication system, and the second communication system is configured to, perform a second cell search process to search for a second cell of a wireless network to camp on from cells having a carrier frequency on the obtained fourth list or cells having a carrier frequency on both the obtained second list of carrier frequencies each having a signal strength above a threshold and the third list of carrier frequencies.

12. The mobile communication device of claim 8, wherein the first communication system is further configured to:

when the second communication system is in a first network mode corresponding to a first wireless access technology, the first communication system is in a second network mode corresponding to a second wireless access technology, as a response to a user request, perform the background network search for a wireless network corresponding to the second wireless access technology that is available for the second communication system.

13. The mobile communication device of claim 12, wherein the network search information is public land mobile network (PLMN) identity information of available networks that are found by the first communication system during the background network search.

14. The mobile communication device of claim 8, wherein the first communication system and the second communication system are each configured to operate in one of a Global System for Mobile Communications (GSM) network mode, a Universal Mobile Telecommunications System (UMTS) network mode and a Long Term Evolution (LTE) network mode.

* * * * *